Figure 2:
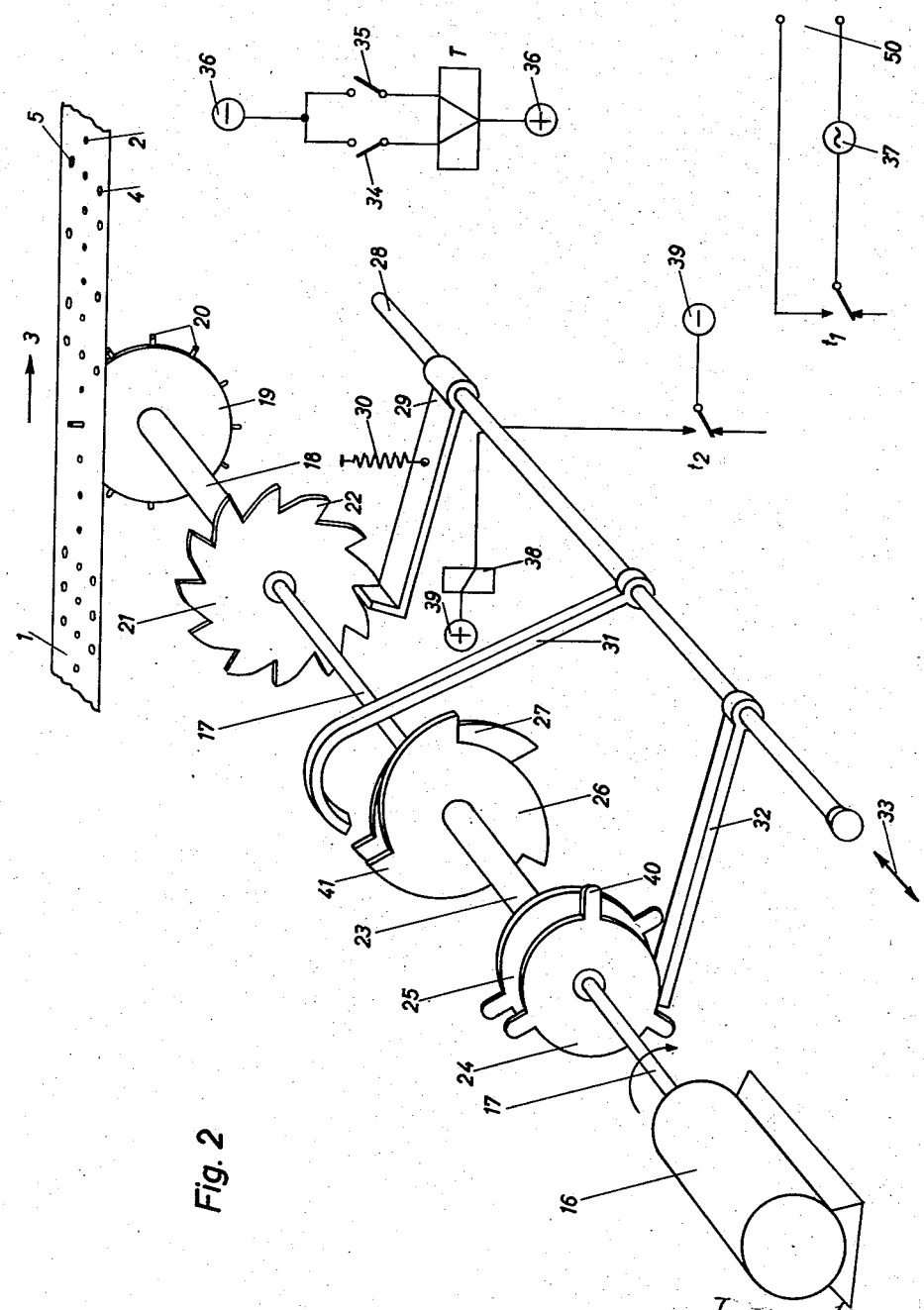

Oct. 21, 1958  R. HELL ET AL  2,857,460
TELEGRAPH CODE PRACTICE KEYER
Filed Nov. 24, 1953  2 Sheets-Sheet 1
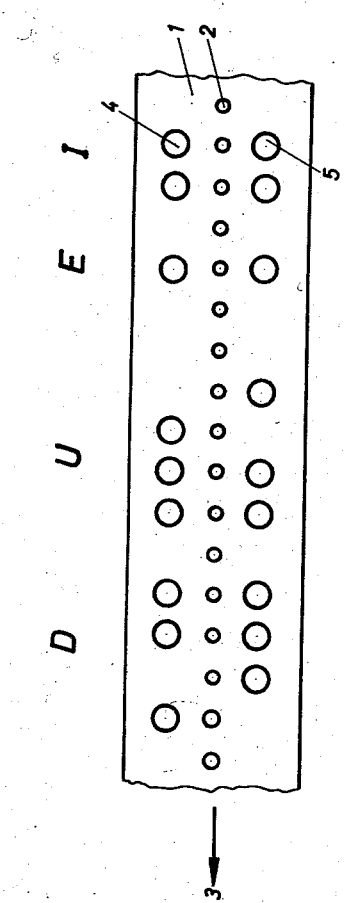
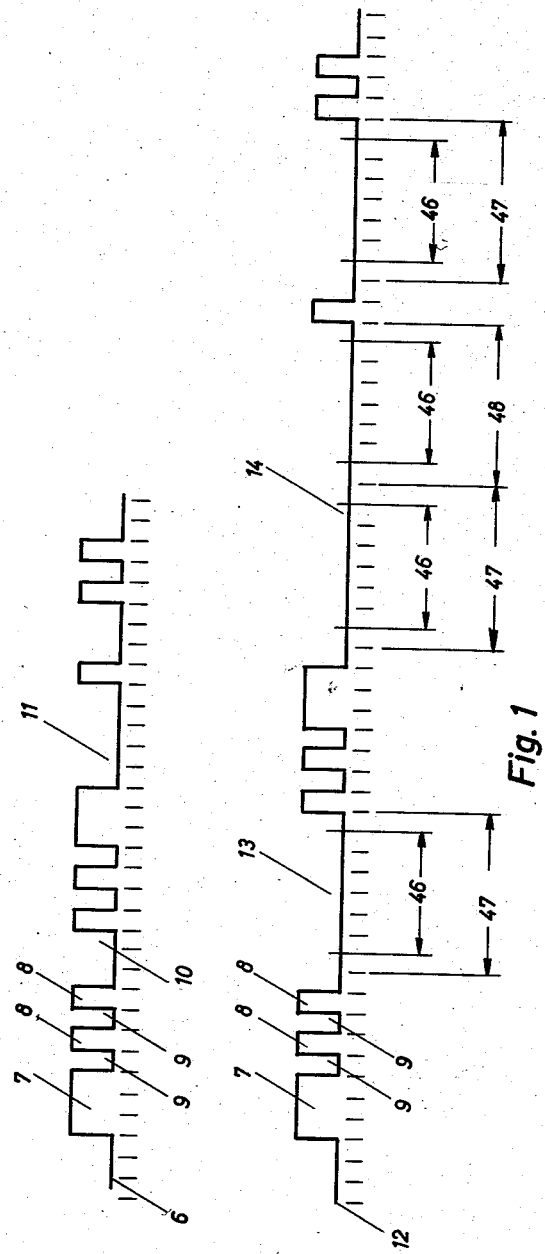
*Fig. 1*
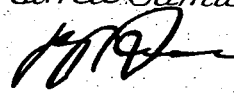

United States Patent Office 2,857,460
Patented Oct. 21, 1958

2,857,460
TELEGRAPH CODE PRACTICE KEYER

Rudolf Hell, Kiel-Dietrichsdorf, and Alfred Samlowski, Bonn-Venusberg, Germany

Application November 24, 1953, Serial No. 394,172

Claims priority, application Germany November 26, 1952

4 Claims. (Cl. 178—115)

This invention relates to code keying and is particularly concerned with a Morse-code practice keyer.

There are code keyers known having two levers for scanning tape perforated in accordance with the Wheatstone Morse code to produce direct or alternating current Morse signals. The length of the dots and dashes forming the individual Morse signals, hereinafter referred to as Morse impulses, are determined in accordance with international agreements. The Morse keyers are used in actual transmitting as well as for practice purposes in the training of students. Alternating current signals which the students can bear are preferred for practice purposes.

The student has initial difficulties with the transmittal speed and, therefore, is trained beginning with low speed which is gradually increased. However, in such increase of speed, the audible impression of signals received by the student is altered; a slowly transmitted Morse signal composed of considerably spaced dots and dashes produces an audible impression which is entirely different from that produced in fast transmission. Accordingly, the student memorizes during his practice entirely false audible images of the Morse signals. He is also tempted to resolve the slowly transmitted signals into individual dots and dashes and, as it were, to "spell" the signals instead of responding to the entirety thereof.

It would be more advantageous to transmit with great speed while interposing prolonged pauses between the signals. The student would then receive the correct impression of each signal in its entirety without being handicapped by rapid succession of the signals. The pauses or intervals could then be gradually shortened until normal speed is attained. This practice method cannot be realized with the known keyers unless using special perforated tapes providing for prolonged pauses. Such tapes would be difficult to prepare, would be of unwieldy length, and would have to be separately provided for each rate of speed.

The invention avoids these drawbacks by using a keyer supplied with normal perforated tape adapted for use in normal high-speed telegraph transmitters and providing means for automatically stopping its operation for an adjustable interval to provide a pause after the scanning of each Morse signal and after the scanning of each word, respectively. The advantage is that each signal is transmitted with relatively great scanning speed, conveying the correct impression, while pauses or intervals of desired length are interposed between the signals and words, respectively.

According to the invention, the perforated tape is moved in known manner past the scanning levers and the tape advance is stopped responsive to the scanning of a space. A cam device which determines the duration of the pauses is at the same time started, such device being adapted to switch in the tape advance after the lapse of the stop interval so that the scanning of the next successive Morse signal can proceed.

The stopping of the tape advance is in accordance with the invention obtained by an impulse magnet which is controlled by the Morse impulses. The impulse magnet deenergizes responsive to obsence of Morse impulses releasing its armature which forms a pawl and causing such pawl to fall into a stop ratchet coupled with the tape advance sprocket. The short intervals between the impulses of the individual signals do not cause stopping of the tape advance because the release of the impulse magnet provides for corresponding delay. The pawl moves into its initial position at the end of each pause between signals to release the stop ratchet so that the tape advance can proceed again.

The structure of the device according to the invention is simple, and it may therefore be provided for practice purposes in conjunction with substantially any existing commercial Morse transmitter or keyer.

The invention will now be described with reference to the accompanying diagrammatic drawings in which Fig. 1 shows on top a perforated Morse tape; underneath such tape a curve representing the signals; and at the bottom a similar signal curve with the prolonged pauses between the signals; and Fig. 2 illustrates schematically an embodiment of a keyer with mechanical pause control.

In Fig. 1, the code words DU and EI are perforated in the paper tape 1 in normal Wheatstone code. The central row 2 of perforations serves for the advance of the tape in the direction of the arrow 3. The upper row of perforations 4 and the lower row 5 determine in known manner the start and the end of each Morse impulse.

The curve 6 shows the sequence of the corresponding Morse signals in the form of direct current signals. In the case of alternating current operation, the impulses will determine the shape of the curve corresponding to the impulse frequency. As is usual, the Morse dash 7 is three times as long as the dot 8; the intervening spaces 9 between adjacent impulses are each of the length of a dot. The space 10 between the two Morse signals D and U has the length of three dots, and the interval between the two code words DU and EI has the length of five dots. The space between two successive perforations 2, 4 or 5 corresponds to two dots.

The bottom curce 12 illustrates the sequence of the same signals, with a pause 13 prolonged by six dots to a length of nine dots between the signals D and U and a pause 14 between the code words DU and EI which has been prolonged to roughly twice the length, namely, by two times six dots to a length corresponding to seventeen dots. The sequence of the individual Morse impulses within a signal is, however, the same as in the curve 6, that is, the audible impression of the individual Morse signals has been preserved in spite of the reduced speed producing the curve 12.

Referring now to Fig. 2, there is a motor 16 which drives a shaft 17. The shaft 17 drives a hollow extension shaft 18 through the medium of a suitable slip clutch (not shown). The hollow shaft 18 carries the tape advance sprocket 19 whose teeth 20 engage the central perforations 2 in the tape 1. The perforated tape 1, as previously noted, is a normal commercial tape adapted for use in high-speed telegraph transmitters, and is moved in the direction of the arrow 3 responsive to rotation of the drive shaft 17 in clockwise direction.

The stop ratchet 21 is fixedly connected or coupled with the sprocket 19. The number of teeth on the stop ratchet 21 corresponds to the number of teeth on the sprocket 19. There is provided a further hollow shaft 23 which is also driven by the shaft 17 over a suitable slip clutch (not shown). Upon this hollow shaft 23 are two cam disks 24 and 25 having respectively three and two cam projections. Rigidly coupled with these cam disks are two disks 26 and 27 carrying respectively corresponding numbers of cam projections 41. A stop pawl 29 is provided upon an auxiliary shaft 28. This pawl 29 is biased upwardly by a spring 30 and is adapted to engage the teeth 22 of the ratchet 21. The auxiliary shaft 28 also carries a stop lever 31 and a switching lever 32, coacting with the cam disk 24 at a time when the stop pawl 29 engages a tooth 22 on the ratchet 21. The stop lever 31 is at such time out of engagement with the cam disk 26. The length of the cam projections on the disk 24 corresponds to half of the space between two teeth 20 of the sprocket 19. They are arranged so that the cam 41 on the disk 26 hits the stop lever 31 at a time when a cam 40 is about to leave the switching lever 32.

The scanning levers (not shown) which scan the perforated tape 1 actuate the control contacts 34 and 35 in suitable and known manner. These two contacts are connected with a polarized relay T which is supplied from a suitable direct current source 36. The relay T produces signal impulses in accordance with the scanning of the signals on the tape 1 and may therefore be referred to as the "signal relay." Contact 34 is briefly closed at the beginning of a Morse impulse and the signal relay T is actuated into its signal position, thereby switching over its contact $t_1$ which connects the terminals 50 of the Morse keyer to an audible sound frequency generator 37. Contact 35 is briefly closed at the end of the Morse impulse, restoring the signal relay T. The contact $t_1$ accordingly disconnects the sound frequency generator 37 thus terminating the transmission of the audible sound frequency impulse.

The above explained operations are repeated in step with the scanned Morse dots and dashes.

The contact $t_2$ of the signal relay T is actuated at the time of actuation of contact $t_1$ and connects the control magnet 38 with a suitable current source 39. The control magnet 38 is thus actuated in step with the Morse impulses and respectively attracts and releases the stop pawl 29 accordingly so as to control the advance of the tape 1. The control magnet 38 is preferably slow-to-release. It may comprise, for example, a copper slug which causes the release of the stop pawl 29 only after the impulse magnet 38 is without current for the duration of two dots.

If it is, for example, assumed that the Morse signal D (Fig. 1) is being scanned on the perforated tape 1, the control magnet 38 will receive current for the duration of the impulses 7, 8, 8 in accordance with the curve 6. During the two intervening spaces 9, the control magnet 38 will be disconnected from current. The stop pawl 29 will, however, not be released because the spaces 9 are smaller than the release time of the magnet 38 which amounts to an interval of two dots. The ratchet 21 is thus free to rotate for the duration of the entire Morse signal D and the perforated tape is accordingly freely advanced. The stop lever 31 is during this time in engagement with the cam disk 26 and prevents rotation of the hollow shaft 23 and therewith rotation of the disks 24 and 25. After the signal D follows a space 10 amounting to three dots. After the lapse of an interval corresponding to two dots, the control magnet 38 will deenergize and will release the stop pawl 29 which will arrest the stop ratchet 21 and therewith stop the sprocket 19. The stop pawl 31 and the switching lever 32 are coincidentally rotated clockwise. The stop lever 31 frees the cam disk 26 thus permitting rotation of the hollow shaft 23 and the disks 24, 25. During such rotation, the switching lever 32 which has been rotated clockwise together with the stop lever 31 engages the cam disk 24. As soon as the cam 40 of the disk 24 has rotated far enough to press away the switching lever 32, the stop lever 31 will again engage the cam disk 26 and stop it. Accordingly, the hollow shaft 23 has rotated for an interval whose start is determined by the cam 41 of the disk 26 and whose end is determined by the cam 40 on the ratchet 24. The stop disk 21 was stopped for this interval and has interrupted the transmission of Morse impulses. This interval corresponds to the space 46 along the bottom curve of Fig. 1. The angular displacement of the switching lever 32 by the cam 40 causes corresponding counterclockwise displacement of the stop pawl 29 and the advance of the tape is thus freed again for operation by the shaft 17. The next successive Morse signal U can now be scanned and transmitted.

At the end of the code word DU, the releasing stop pawl 29 will again stop the stop ratchet 21 after the lapse of an interval corresponding to two dots. The cam disks 26, 24 begin to rotate for the duration of the interval 46 (Fig. 1). At the end thereof, the stop ratchet 21 is freed again to permit the advance of the perforated tape 1. However, since no Morse impulses follow after the lapse of an interval corresponding to two further dots, that is, after one advance step of the tape, the stop pawl 29 will again fall into the ratchet 21. The cam disks 26, 24 accordingly start rotating again and produce a further delay period 46, thereby doubling the duration of the pause 14 as compared with the pause 13.

If it is desired to change the duration of the pauses, for example, when it is desired to increase the speed of transmission, other cam disk combinations may be used. This may be done either by substituting other cam disks for the disks shown or by shifting the shaft 28 by suitable means (not shown) in the direction of the arrow 33. The levers 31, 32 are thereby switched from the cam disks 26, 24, for example, for coaction with the cam disks 27, 25. It is also possible, of course, to combine the cams 27, 25 and 26, 24 in a common cam structure. The cams and stop disks may be made of thin sheet material having relatively little mass so that the advance of the perforated tape and its release may be effected quickly.

We claim:

1. In a Morse code practice keyer device, a code-perforated tape adapted for use as a signal transmitting element in a commercial telegraph transmitter, a first rotatable shaft carrying a sprocket for advancing said tape, a toothed ratchet coupled with said sprocket for rotation therewith, a second shaft, a slip clutch operatively coupling said second shaft with said first shaft, a motor for continuously rotating said second shaft to cause rotation of said first shaft for rotating said ratchet and said sprocket, a pawl for cooperation with said ratchet for selectively restricting rotation of said first shaft, a control magnet for governing the operation of said pawl, a signal relay actuated in accordance with the Morse signals incorpoated in said tape in the form of perforations thereon, circuit means governed by said signal relay upon actuation thereof for actuating said control magnet to move said pawl relative to said ratchet so as to permit rotation of said ratchet and therewith rotation of said sprocket and consequently advance of said tape for the duration of the transmission of complete Morse signals on said tape, said control magnet becoming inoperative after each transmission of a complete Morse signal to cause said pawl to engage said ratchet for stopping it and therewith advance of said tape, means for producing a delay to cause disengagement of said ratchet pawl after an interval exceeding the normal time interval between successive impulses of a complete Morse signal to prolong intervals between such complete signals, and adjustable mechanical means for variably adjusting the duration of said intervals, said mechanical means comprising cam means for controlling the cooperation of said pawl with said ratchet, and means for making said cam means selectively effective to vary the duration of said time intervals.

2. In a Morse code practice keyer device, a code-perforated tape adapted for use as a signal transmitting element in a commercial telegraph transmitter, a first rotatable shaft carrying a sprocket for advancing said tape, a toothed ratchet coupled with said sprocket for rotation therewith, a second shaft, a slip clutch operatively coupling said second shaft with said first shaft, a motor for continuously rotating said second shaft to cause rotation of said first shaft for rotating said ratchet and said sprocket, a pawl for cooperation with said ratchet for selectively restricting rotation of said first shaft, a control magnet for governing the operation of said pawl, a signal relay actuated in accordance with the Morse signals incorporated in said tape in the form of perforations thereon, circuit means governed by said signal relay upon actuation thereof for actuating said control magnet to move said pawl relative to said ratchet so as to permit rotation of said ratchet and therewith rotation of said sprocket and consequently advance of said tape for the duration of the transmission of complete Morse signals on said tape, said control magnet becoming inoperative after each transmission of a complete Morse signal to cause said pawl to engage said ratchet for stopping it and therewith advance of said tape, means for producing a delay to cause disengagement of said ratchet pawl after an interval exceeding the normal time interval between successive impulses of a complete Morse signal to prolong intervals between such complete signals, and adjustable mechanical means for variably adjusting the duration of said intervals, said mechanical means comprising an auxiliary shaft carrying said pawl, a plurality of cam means driven by said second shaft, lever means on said auxiliary shaft for coaction respectively with predetermined ones of said cam means, and means for axially shifting said auxiliary shaft to displace said lever means for coaction with other of said cam means.

3. In a Morse code practice keyer device, a code-perforated tape adapted for use as a signal transmitting element in a commercial telegraph transmitter, a first rotatable shaft carrying a sprocket for advancing said tape, a toothed ratchet coupled with said sprocket for rotation therewith, a second shaft, a slip clutch operatively coupling said second shaft with said first shaft, a motor for continuously rotating said second shaft to cause rotation of said first shaft for rotating said ratchet and said sprocket, a pawl for cooperation with said ratchet for selectively restricting rotation of said first shaft, a control magnet for governing the operation of said pawl, a signal relay actuated in accordance with the Morse signals incorporated in said tape in the form of perforations thereon, circuit means governed by said signal relay upon actuation thereof for actuating said control magnet to move said pawl relative to said ratchet so as to permit rotation of said ratchet and therewith rotation of said sprocket and consequently advance of said tape for the duration of the transmission of complete Morse signals on said tape, said control magnet becoming inoperative after each transmission of a complete Morse signal to cause said pawl to engage said ratchet for stopping it and therewith advance of said tape, means for producing a delay to cause disengagement of said ratchet pawl after an interval exceeding the normal time interval between successive impulses of a complete Morse signal to prolong intervals between such complete signals, and adjustable mechanical means for variably adjusting the duration of said intervals, said mechanical means comprising an auxiliary shaft carrying said pawl, a plurality of cam means driven by said second shaft, lever means on said auxiliary shaft for coaction respectively with predetermined ones of said cam means, one of said last-named lever means controlling the actuation of said pawl to cause engagement thereof with said ratchet, and means for axially shifting said auxiliary shaft to displace said lever means for coaction with other of said cam means.

4. In a Morse code practice keyer device, a code-perforated tape adapted for use as a signal transmitting element in a commercial telegraph transmitter, a first rotatable shaft carrying a sprocket for advancing said tape, a toothed ratchet coupled with said sprocket for rotation therewith, a second shaft, a slip clutch operatively coupling said second shaft with said first shaft, a motor for continuously rotating said second shaft to cause rotation of said first shaft for rotating said ratchet and said sprocket, a pawl for cooperation with said ratchet for selectively restricting rotation of said first shaft, a control magnet for governing the operations of said pawl, a signal relay actuated in accordance with the Morse signals incorporated in said tape in the form of perforations thereon, circuit means governed by said signal relay upon actuation thereof for actuating said control magnet to move said pawl relative to said ratchet so as to permit rotation of said ratchet and therewith rotation of said sprocket and consequently advance of said tape for the duration of the transmission of complete Morse signals on said tape, said control magnet becoming inoperative after each transmission of a complete Morse signal to cause said pawl to engage said ratchet for stopping it and therewith advance of said tape, means for producing a delay to cause disengagement of said ratchet pawl after an interval exceeding the normal time interval between successive impulses of a complete Morse signal to prolong intervals between such complete signals, and adjustable mechanical means for variably adjusting the duration of said intervals, said mechanical means comprising an auxiliary shaft carrying said pawl, a set of exchangeable delay producing cam means driven by said second shaft, and lever means on said auxiliary shaft for coaction with said delay producing cam means.

References Cited in the file of this patent

UNITED STATES PATENTS

| | | |
|---|---|---|
| 1,343,754 | Woodland | June 15, 1920 |
| 2,293,629 | Rowe | Aug. 18, 1942 |
| 2,419,292 | Shepard | Apr. 22, 1947 |
| 2,702,313 | Andrews | Feb. 15, 1955 |
| 2,772,326 | Hickey et al. | Nov. 27, 1956 |